United States Patent
Schindler et al.

(10) Patent No.: US 8,076,401 B2
(45) Date of Patent: Dec. 13, 2011

(54) TRANSPARENT POLYMER MIXTURES WHICH CONTAIN ALKOXYSILANE-TERMINATED POLYMERS

(75) Inventors: Wolfram Schindler, Tuessling (DE); Elke Schwiebacher, Simbach (DE)

(73) Assignee: Wacker Chemie AG, Munich (DE)

( * ) Notice: Subject to any disclaimer, the term of this patent is extended or adjusted under 35 U.S.C. 154(b) by 376 days.

(21) Appl. No.: 12/300,081

(22) PCT Filed: May 8, 2007

(86) PCT No.: PCT/EP2007/054434
§ 371 (c)(1), (2), (4) Date: Nov. 7, 2008

(87) PCT Pub. No.: WO2007/131912
PCT Pub. Date: Nov. 22, 2007

(65) Prior Publication Data
US 2009/0156737 A1 Jun. 18, 2009

(30) Foreign Application Priority Data
May 11, 2006 (DE) .................. 10 2006 022 095

(51) Int. Cl.
*C08K 3/34* (2006.01)
(52) U.S. Cl. ........................... 524/186; 524/588
(58) Field of Classification Search ............ 524/186, 524/588
See application file for complete search history.

(56) References Cited

U.S. PATENT DOCUMENTS

| | | | |
|---|---|---|---|
| 3,971,751 A | 7/1976 | Isayama et al. | |
| 5,118,290 A | 6/1992 | Muller et al. | |
| 5,254,657 A | 10/1993 | Inoue | |
| 5,554,709 A * | 9/1996 | Emmerling et al. | 528/27 |
| 6,545,087 B1 | 4/2003 | Schmalstieg et al. | |
| 7,211,616 B2 | 5/2007 | Kaszubski et al. | |
| 7,319,128 B2 | 1/2008 | Ziche | |
| 7,332,541 B2 | 2/2008 | Schindler et al. | |
| 2003/0153671 A1 * | 8/2003 | Kaszubski et al. | 524/492 |
| 2004/0204539 A1 | 10/2004 | Schindler et al. | |
| 2005/0101753 A1 | 5/2005 | Schindler et al. | |
| 2005/0119436 A1 * | 6/2005 | Ziche et al. | 528/29 |
| 2008/0245476 A1 | 10/2008 | Loth et al. | |

FOREIGN PATENT DOCUMENTS

| | | |
|---|---|---|
| CN | 1637043 A | 7/2005 |
| DE | 4029505 A | 3/1992 |
| DE | 19849817 A | 5/2000 |
| DE | 10355318 A1 | 6/2005 |
| DE | 10 2005 054 008 A1 | 5/2007 |
| EP | 0269819 A | 6/1988 |
| EP | 0931800 A | 7/1999 |
| EP | 1041119 A | 10/2000 |
| EP | 1535940 A | 6/2005 |
| KR | 2004091044 A | 10/2004 |
| WO | 9634030 A | 10/1996 |
| WO | 0037533 A | 6/2000 |
| WO | 03/018658 A1 | 6/2003 |
| WO | 03/068886 A1 | 8/2003 |
| WO | 2004/022618 A1 | 3/2004 |
| WO | 2007054300 A1 | 5/2007 |

OTHER PUBLICATIONS

Wacker Silicones, Geniosil, "One Step Ahead—Organofunctional Silanes From Wacker". Issued Sep. 2003, pp. 1-28. Enclosed in both German and English versions.

* cited by examiner

*Primary Examiner* — Ling Choi
*Assistant Examiner* — Chun-Cheng Wang
(74) *Attorney, Agent, or Firm* — Brooks Kushman P.C.

(57) ABSTRACT

Room temperature, moisture curable, transparent, and non-yellowing polymer blends contain at least one alkoxysilyl-terminated polymer bearing an end group $$-A-(CH_2)_m-SiR^1{}_a-(OR^2)_{3-a}$$

where A is a divalent linker group, contain a silica filler of high surface area as the sole filler, and is catalyzed by a catalyst which is free or substantially free of amine groups.

8 Claims, No Drawings

US 8,076,401 B2

TRANSPARENT POLYMER MIXTURES WHICH CONTAIN ALKOXYSILANE-TERMINATED POLYMERS

CROSS-REFERENCE TO RELATED APPLICATIONS

This application is the U.S. national phase of PCT appln. No. PCT/EP2007/054434 filed May 8, 2007 which claims priority to German application DE 10 2006 022 095.1 filed May 11, 2006.

BACKGROUND OF THE INVENTION

1. Field of the Invention

The invention relates to transparent polymer blends which comprise alkoxysilane-terminated polymers and silicas with a large BET surface area and to a catalyst system which is free from amine functionality.

2. Description of the Related Art

Polymer systems which possess reactive alkoxysilyl groups are well established. In the presence of atmospheric moisture these alkoxysilane-terminated polymers are capable even at room temperature of condensing with one another, with elimination of the alkoxy groups. Depending on the amount of alkoxysilane groups and their construction, the products are principally long-chain polymers (thermoplastics), relatively wide-meshed three-dimensional networks (elastomers) or else highly crosslinked systems (thermosets).

The alkoxysilane-terminated polymers in question may be polymers with an organic backbone, such as polyurethanes, polyesters, polyethers, etc., described inter alia in EP-A-269 819, EP-A-931 800, WO 00/37533, U.S. Pat. No. 3,971,751, and DE 198 49 817, or polymers whose backbone is composed wholly or at least partly of organosiloxanes, described inter alia in WO 96/34030 and U.S. Pat. No. 5,254,657.

In line with the countless possibilities for the design of silane-terminated polymer systems of this kind, not only the properties of the uncrosslinked polymers or of the polymer-containing mixtures (viscosity, melting point, solubilities, etc.) but also the properties of the fully crosslinked compositions (hardness, elasticity, tensile strength, elongation at break, heat resistance, etc.) can be tailored on a virtually custom basis. Correspondingly diverse, therefore, are the possibilities for use of silane-terminated polymer systems of this kind. Thus they can be used, for example, to produce elastomers, sealants, adhesives, elastic adhesive systems, rigid and flexible foams, any of a very wide variety of coating systems, or for impression compounds. These products can be applied in any form, as for example by spreading, spraying, pouring, pressing, knifing, etc., depending on the composition of the formulations.

One particularly interesting application in the adhesives and sealants segment are formulations which remain transparent after curing. Applications for these adhesives and sealants are indicated in those cases where the adhesive seam is not to be visible or where the coloring of the components to be bonded does not allow a suitable selection of colored, filled adhesives. A further advantage of the transparent compositions is that they can be employed more universally. In the case of colored compositions there is always a need to offer a broad range of colors in order to cover the widest possible variety of applications. A particularly high optical challenge in relation to the adhesive bond is posed, for example, in the glazing sector.

Transparent compositions ought also to remain transparent. To date, a large number of the products have exhibited distinct subsequent yellowing during storage and exposure to light, particularly under UV exposure. The reasons for this yellowing are primarily the presence of amine compounds in the formulations. In the case of the typical formulations of silylated polymers, amines are added, mostly in the form of aminosilanes. These compounds serve as adhesion promoters and also as a co-catalyst for curing. Examples of such compositions are described in EP 1041119 A.

In compositions that are filled with chalk, the yellowing can in many cases be compensated by the formulation or simply does not occur. In transparent compositions, there is hardly any possibility of masking yellowing. The addition of dyes—usually bluish dyes—for the purpose of superimposition on the yellowing is common practice. However, it is effective only with limitations, since more severe yellowing produces a "green tint", which can even turn to brown.

SUMMARY OF THE INVENTION

The invention provides polymer blends (P) which comprise
A) alkoxysilane-terminated polymers (A) having at least one end group of the general formula (1)

   (1)

where
A is a divalent linker group selected from —O—, —S—, —(R$^3$)N—, —O—CO—N(R$^3$)—, —N(R$^3$)—CO—O—, —N(R$^3$)—CO—NH—, —NH—CO—N(R$^3$)—, and —N(R$^3$)—CO—N(R$^3$)—,
R$^1$ is an optionally halogen-substituted alkyl, cycloalkyl, alkenyl or aryl radical having 1-10 carbon atoms,
R$^2$ is an alkyl radical having 1-6 carbon atoms or an ω-oxaalkyl-alkyl radical having in total 2-10 carbon atoms,
R$^3$ is hydrogen, an optionally halogen-substituted cyclic, linear or branched $C_1$ to $C_{18}$ alkyl or $C_2$ to $C_{18}$ alkenyl radical or a $C_6$ to $C_{18}$ aryl radical,
a is an integer from 0 to 2, and
m is an integer from 1 to 6,
B) fumed or precipitated silica having a BET surface area of at least 50 m$^2$/g, and
C) a catalyst with not more than 0.05% by weight of amino compounds, and no other fillers.

The invention provides polymer blends (P) which comprise
A) alkoxysilane-terminated polymers (A) having at least one end group of the general formula (1)

   (1)

where
A is a divalent linker group selected from —O—, —S—, —(R$^3$)N—, —O—CO—N(R$^3$)—, —N(R$^3$)—CO—O—, —N(R$^3$)—CO—NH—, —NH—CO—N(R$^3$)—, —N(R$^3$)—CO—N(R$^3$)—,
R$^1$ is an optionally halogen-substituted alkyl, cycloalkyl, alkenyl or aryl radical having 1-10 carbon atoms,
R$^2$ is an alkyl radical having 1-6 carbon atoms or an ω-oxaalkyl-alkyl radical having in total 2-10 carbon atoms,
R$^3$ is hydrogen, an optionally halogen-substituted cyclic, linear or branched $C_1$ to $C_{18}$ alkyl or alkenyl radical or a $C_6$ to $C_1$ aryl radical,
a is an integer from 0 to 2, and
m is an integer from 1 to 6,
B) fumed or precipitated silica having a BET surface area of at least 50 m$^2$/g, and
C) a catalyst with not more than 0.05% by weight of amino compounds, and no other fillers.

The polymer blends (P) are transparent. It has been found that in the transparent polymer blends (P) it is possible to use a very broad range of silicas while yet producing systems of very high transparency. In the case of other polymers, in contrast, it is necessary to use more specific, and especially coated, silicas, usually with a higher BET surface area of at least 300 m$^2$/g.

Moreover, the polymer blends (P) do not exhibit yellowing under storage and exposure to light.

Since the alkoxysilane-terminated polymers (A) have very high reactivities, especially when m is the number 1, it is possible to do without the use of amines or aminosilanes as co-catalysts.

The polymer blends (P) can be provided as one- or two-component formulations. In two-component polymer blends (P), the polymer (A) is blended with the silica (B) as a base component, and the catalyst (C) is preferably formulated in the curative component. Particular preference is given to polymer blends which exhibit one-component curing.

The polymer blends (P) preferably comprise a catalyst with not more than 0.01% by weight of amino compounds, and more particularly no amino compounds. Amino compounds encompassed here are primary, secondary or else tertiary amines, which either may have a catalytic effect on the curing of the polymers (A) or are added as a co-catalyst. Typically these are strongly basic compounds such as triethylamine, tributylamine, cyclohexylamine, 1,4-diazabicyclo[2.2.2]octane, 1,8-diazabicyclo[5.4.0]undec-7-ene or else aminosilanes such as aminopropyltrimethoxysilane, aminopropyltriethoxysilane or N-aminoethylaminopropyltrimethoxysilane.

The main chains of the alkoxysilane-terminated polymers (A) which can be used may be branched or unbranched. The average chain lengths may be adapted arbitrarily in accordance with the particular desired properties both in the non-crosslinked mixture and in the cured composition. They may be constructed from different building blocks. These building blocks are typically polysiloxanes, polysiloxane-urea/urethane copolymers, polyurethanes, polyureas, polyethers, polyesters, polyacrylates and polymethacrylates, polycarbonates, polystyrenes, polyamides, polyvinyl esters or polyolefins such as, for example, polyethylene, poly-butadiene, ethylene-olefin copolymers or styrene-butadiene copolymers. It is of course also possible to use any desired mixtures or combinations of polymers with different main chains.

For preparation of polymers (A) having silane terminations of the general formula (1) there are a multiplicity of known possibilities, including more particularly:

Copolymerization with the participation of unsaturated monomers which possess groups of the general formula (1). Examples of such monomers would include vinyltrimethoxysilane, vinylmethyl-dimethoxysilane, (meth)acryloyloxypropyltrimethoxysilane, (meth)acryloyloxymethyltrimethoxysilane, (meth)acryloyloxymethylmethyldimethoxysilane or else the corresponding ethoxysilyl compounds.

Graft addition of unsaturated monomers which possess groups of the general formula (1) onto thermoplastics such as polyethylene. Examples of such monomers would include vinyltrimethoxysilane, vinylmethyldimethoxysilane, (meth)acryloyloxy-propyltrimethoxysilane, (meth)acryloyloxy-methyltrimethoxysilane, (meth)acryloyloxymethylmethyldimethoxysilane or else the corresponding ethoxysilyl compounds.

Hydrosilylation of H-silanes such as dimethoxymethylsilane, diethoxymethylsilane, trimethoxymethylsilane or triethoxysilane with unsaturated, terminal or internal double bonds, usually with platinum catalysis.

Reaction of a prepolymer (A1) with one or more organosilanes (A2) of the general formula (2)

$$C-B-(CH_2)_m-SiR^1_a(OR^2)_{3-a} \quad (2)$$

in which $R^1$, $R^2$, $R^3$, m and a have the definitions stated above,

B is an oxygen, nitrogen or sulfur atom, and C-B- represents a functional group which is reactive toward suitable functional groups of the prepolymer (A1).

Where the prepolymer (A1) is itself composed of two or more building blocks (A11, A12 . . . ), it is not absolutely necessary first to prepare from these building blocks (A11, A12 . . . ) the prepolymer (A1) and then react it with the silane (A2) to give the finished polymer (A). It is also possible here, for instance, to reverse the reaction steps, by first reacting one or more building blocks (A11, A12 . . . ) with the silane (A2), and only then reacting the resultant compounds with the remaining building blocks (A11, A12 . . . ) to give the completed polymer (A). Examples of prepolymers (A1) composed of building blocks A11, A12 are OH—, NH— or NCO-terminated polyurethanes and polyureas which can be prepared from polyisocyanates (building block A11) and also polyols (building block A12).

Preferred polymers (A) with silane terminations of the general formula (1) are silane-terminated polyethers and polyurethanes, more preferably polyethers, which are prepared from organosilane (A2) of the general formula (4) and the prepolymer (A1).

One preferred mode of preparation of the polymers (A) uses a silane (A2) which is selected from silanes of the general formula (3)

$$OCN-(CH_2)_m-SiR^1_a(OR^2)_{3-a} \quad (3)$$

where
$R^1$, $R^2$, $R^3$, and a possess the definitions stated above and m is 1 or 3.

In the context of the preparation of the polymers (A), the concentrations of all isocyanate groups and all isocyanate-reactive groups that are involved in all of the reaction steps, and also the reaction conditions, are preferably chosen such that, in the course of the polymer synthesis, all of the isocyanate groups are consumed by reaction. The completed polymer (A), therefore, is preferably isocyanate-free.

Particularly suitable polyols for preparing the polymers (A) are aromatic and aliphatic polyester polyols and polyether polyols, of the kind widely described in the literature. In principle, however, it is possible to use all polymeric, oligomeric or else monomeric alcohols having one or more OH functions.

Preferably $R^1$ is a phenyl radical or alkyl or alkenyl radical having 1-6 carbon atoms, more particularly methyl, ethyl or vinyl radical.

Preferably $R^2$ is an alkyl radical having 1-3 carbon atoms, more particularly methyl or ethyl radical.

Preferably $R^3$ is hydrogen, a phenyl radical or alkyl or alkenyl radical having 1-6 carbon atoms, more particularly methyl, ethyl or n-propyl radical.

m is preferably 1 or 3.

The silicas (B) with a BET surface area of at least 50 m$^2$/g are referred to as reinforcing fillers. Silicas (B) may be hydrophilic or hydrophobicized, as for example by treatment with organosilanes, organo-silazanes or organosiloxanes, or by etherification of hydroxyl groups to alkoxy groups.

Particular preference is given to hydrophobicized silicas (B). The BET surface area of the silicas (B) is preferably at least 100 m$^2$/g, preferably not more than 500 m$^2$/g, more particularly not more than 250 m$^2$/g.

Catalysts (C) are preferably condensation catalysts. Preferred catalysts (C) are tin compounds, such as dibutyltin dilaurate, dibutyltin maleate, dibutyltin diacetate, dibutyltin dioctanoate, dibutyltin acetylacetonate, dibutyltin oxide, or corresponding compounds of dioctyltin; or else other Lewis acid compounds of the transition metals such as titanate, zirconium, hafnium, zinc, boron, aluminum, bismuth, etc. In addition, carboxylic acids, phosphoric acids and their partial esters, phosphorous acids and their partial esters, toluenesulfonic acids or mineral acids may be used as catalysts. The various catalysts can be used either in pure form or else as mixtures. The catalysts are preferably free from residues which, themselves or through degradation, may form chromophoric groups.

In the polymer blends (P) the fraction of alkoxysilane-terminated polymers (A) is preferably 10-90% by weight, more preferably 20-70% by weight, more particularly 30-50% by weight. The fraction of silicas (B) is preferably 0.1-25% by weight, more preferably 2-20% by weight, more particularly 5-15% by weight. The fraction of catalyst (C) is preferably 0.01-10% by weight, more preferably 0.1-5% by weight, more particularly 0.1-2% by weight.

The polymer blends (P) may comprise water scavengers and silane crosslinkers, examples being vinylsilanes such as vinyltrimethoxysilane, vinyltriethoxysilane, vinylmethyldimethoxysilane, O-methylcarbamatomethyl-methyldimethoxysilane, O-methylcarbamatomethyl-trimethoxysilane, O-ethylcarbamatomethyl-methyldiethoxysilane, O-ethylcarbamatomethyl-triethoxysilane, alkylalkoxysilanes in general, or else further organofunctional silanes.

The water scavengers and silane crosslinkers are preferably used in concentrations of 0.1%-10% by weight, more preferably 0.5-2% by weight of the polymer blends (P).

The polymer blends (P) may comprise plasticizers, examples being phthalate esters, such as dioctyl phthalate, diisooctyl phthalate, diundecyl phthalate, adipic esters, such as dioctyl adipate, benzoic esters, glycol esters, phosphoric esters, polyesters, polyethers, polystyrenes, polybutadienes, polyisobutenes, paraffinic hydrocarbons, higher, branched hydrocarbons, etc. The plasticizers are preferably used in concentrations of up to 50% by weight of the polymer blends (P).

The polymer blends (P) may further comprise light stabilizers, such as those known as HALS stabilizers, fungicides, flame retardants, pigments, etc., of the kind known for use in conventional alkoxy-crosslinking one-component compositions.

To generate the particular desired profiles of properties both in the noncrosslinked polymer blends (P) and in the cured compositions it is preferred to use above additives.

For the polymer blends (P) there exist countless different applications in the area of adhesives, sealants, and joint-sealers, surface coatings, and also in the production of impression compounds and moldings.

In these contexts the polymer blends (P) are suitable for countless different substrates such as, for example, mineral substrates, metals, plastics, glass, ceramic, etc.

All of the above symbols in the above formulae have their definitions in each case independently of one another. In all formulae the silicon atom is tetravalent.

In the examples which follow, unless indicated otherwise, all amounts and percentages are by weight.

EXAMPLES

Examples 1a

Preparation of One-Component Formulations 425 g of each of the silane-terminated polyethers, available under the name GENIOSIL® STP-E10 and GENIOSIL® STP-E15 from Wacker Chemie AG, are mixed at 25° C. in a laboratory planetary mixer from PC-Laborsystem, equipped with two cross-arm mixers, with 10.0 g of GENIOSIL® XL10 (Wacker Chemie AG), and 90 g of a hydrophobicized silica HDK® H18 (Wacker Chemie AG) are stirred in until distributed homogeneously. Subsequently 20 g of glycidyloxypropyltrimethoxysilane (GENIOSIL® GF80—Wacker Chemie AG) and 10 g of TINUVIN® 292 (Ciba AG) are incorporated at 200 rpm for 1 minute. Finally 20 g of dibutyltin dilaurate (Merck) are dispersed at 200 rpm for 1 minute, and the mixture is homogenized at 600 rpm for 2 minutes and at 200 rpm for 1 minute under a partial vacuum (approximately 100 mbar) and stirred free from bubbles.

The formulation is dispensed into 310 ml of PE cartridges and stored at 25° C. for one day.

Comparative Example 1b

Not Inventive

Preparation is as for example 1a, with the incorporation in the last step, in addition to the dibutyltin dilaurate, of 10 g of aminopropyltrimethoxy-silane (GENIOSIL® GF96—Wacker Chemie AG).

Determination of the Mechanical Properties

The samples are coated out onto milled Teflon® plaques with a depth of 2 mm and cured for 2 weeks at 23° C. and 50 relative humidity.

The mechanical properties are determined in accordance with DIN 53504 (tensile test) and DIN 53505 (Shore A hardness).

UV Storage

The determination of the yellowing under UV storage takes place in an uncooled lighting chamber with UV lamps from Osram—Ultra-Vitalux® 300 W. The temperature in the chamber is between 50-60° C. The values are set out in table 1:

TABLE 1

|  | Example | |
| --- | --- | --- |
|  | Example 1a | Comparative example 1b* |
| GENIOSIL STP-E10 | 42.5% | 42.0% |
| GENIOSIL STP-E15 | 42.5% | 42.0% |
| GENIOSIL XL 10 | 1.0% | 1.0% |
| HDK H 18 | 9.0% | 9.0% |
| GENIOSIL GF 80 | 2.0% | 2.0% |
| TINUVIN 292 | 1.0% | 1.0% |
| DBTL | 2.0% | 2.0% |
| GENIOSIL GF 96 |  | 1.0% |
| Appearance | transparent | transparent, pale yellow |
| Skinover time | 70 min | 11 min |
| Film after 1 week UV | transparent | colored yellow |

*Vulcanisate according to DIN 53504 and DIN 53505

TABLE 1-continued

| | Example | |
|---|---|---|
| | Example 1a | Comparative example 1b* |
| Modulus S1 in N/mm² | 1.31 | 1.31 |
| Shore A | 46 | 46 |
| Breaking extension S1 in % | 159 | 175 |
| Breaking strength S1 in N/mm² | 1.8 | 2 |

*not inventive

Examples 2

Preparation of Two-Component Formulations

Formulations are prepared in the same way as in the process described in example 1. Here, however, the base component and the curative component are prepared independently of one another. The mixing of the components for the purpose of producing the test specimens was carried out in a Speed-Mixer® from Hauschild—for this purpose 50 g of mixture were mixed at 3000 revolutions for 1 minute and the mixture was processed immediately.

The values are set out in table 2:

TABLE 2

| | Example | | | |
|---|---|---|---|---|
| | 2a | 2b | 2c* | 2d* |
| Base component | | | | |
| GENIOSIL STP-E10 | 24.8% | | | |
| GENIOSIL STP-E15 | 24.7% | 49.5% | 47.5% | 48.5% |
| GENIOSIL XL 10 | 1.0% | 1.0% | 1.0% | 1.0% |
| HDK H 18 | 7.5% | 7.5% | 7.5% | 7.5% |
| GENIOSIL GF 80 | 1.0% | 1.0% | 1.0% | 1.0% |
| GENIOSIL GF 91 | | | 2.0% | |
| GENIOSIL GF 96 | | | | 1.0% |
| Curative component | | | | |
| Polyether plasticizer | 29.9% | 30.0% | 30.0% | 30.0% |
| distilled water | 0.5% | 0.5% | 0.5% | 0.5% |
| Tinuvin 292 | 1.0% | 1.0% | 1.0% | 1.0% |
| DBTL | 2.0% | 2.0% | 2.0% | 2.0% |
| Butyl phosphate | 0.1% | | | |
| HDK H 18 | 7.5% | 7.5% | 7.5% | 7.5% |
| | transparent | transparent | transparent, pale yellow | transparent |
| Pot life | 76 min | 46 min | 5 min | 11 min |
| Film after 1 week UV | transparent | transparent | yellow-orange | yellow |
| Vulcanisate according to DIN 53504 and DIN 53505 | | | | |
| Modulus S1 in N/mm² | 1.19 | 1.30 | 1.80 | 1.59 |
| Shore A | 42 | 43 | 46 | 47 |
| Breaking extension S1 in % | 238 | 200 | 107 | 135 |
| Breaking strength S1 in N/mm² | 2.6 | 2.2 | 1.9 | 2.0 |

*not inventive

Determination of the Mechanical Properties

The samples are coated out onto milled Teflon® plaques with a depth of 2 mm and cured for 2 weeks at 23° C. and 50 relative humidity.

The mechanical properties are determined in accordance with DIN 53504 (tensile test) and DIN 53505 (Shore A hardness).

UV Storage

The determination of the yellowing under UV storage takes place in an uncooled lighting chamber with UV lamps from Osram—Ultra-Vitalux® 300 W. The temperature in the chamber is between 50-60° C.

The invention claimed is:

1. A polymer blend which cures to a transparent solid polymer, comprising:
   A) alkoxysilane-terminated polymer(s) (A) having a main chain and at least one end group of the formula (1)

$$\text{-A-}(CH_2)_m\text{—SiR}^1{}_a(OR^2)_{3-a} \quad (1)$$

where
   A each independently is a divalent linker group selected from the group consisting of —O—, —S—, —O—CO—N(R³)—, —N(R³)—CO—O—, —N(R³)—CO—NH—, —NH—CO—N(R³)—, and —N(R³)—CO—N(R³)—,
   $R^1$ is an optionally halogen-substituted alkyl, cycloalkyl, alkenyl or aryl radical having 1 up to 10 carbon atoms,
   $R^2$ is an alkyl radical having 1-6 carbon atoms or an ω-oxaalkyl-alkyl radical having in total 2-10 carbon atoms,
   $R^3$ is hydrogen, an optionally halogen-substituted cyclic, linear or branched $C_1$ to $C_{18}$ alkyl or $C_2$ to $C_{18}$ alkenyl radical or a $C_6$ to $C_{18}$ aryl radical,
   a is an integer from 0 to 2, and
   m is 1,
   B) fumed or precipitated silica having a BET surface area of at least 50 m²/g, and
   C) a catalyst with not more than 0.05% by weight of amino compounds, and no other fillers.

2. The polymer blend of claim 1, wherein a main chain of the alkoxysilane-terminated polymers (A) comprises a polysiloxane, polysiloxane-urea/urethane copolymer, polyurethane, polyurea, polyether, polyester, polyacrylate, polymethacrylate, polycarbonate, polystyrene, polyamide, polyvinyl ester, or polyolefin copolymer, or a mixture of at least one of these with another polymer.

3. The polymer blend of claim 1, wherein the polymers (A) are obtained by reaction of silanes of the formula (3)

$$\text{OCN—}(CH_2)_m\text{—SiR}^1{}_a(OR^2)_{3-a} \quad (3)$$

where
m is 1 or 3,
with a polyester polyol, polyether polyol, or mixture thereof.

4. The polymer blend of claim 1, wherein $R^2$ is an alkyl radical having 1-3 carbon atoms.

5. The polymer blend of claim 1, wherein $R^2$ is methyl.

6. The polymer blend of claim 1, wherein the silicas (B) have been hydrophobicized by treatment with organosilanes, organosilazanes or organosiloxanes or by etherification of hydroxyl groups to alkoxy groups.

7. The polymer blend of claim 1, wherein at least one catalyst (C) is selected from the group consisting of tin compounds; Lewis acid compounds of the transition metals titanium, zirconium, hafnium, zinc, boron, aluminum, and bismuth; carboxylic acids; phosphoric acids; partial esters of phosphoric acids; phosphorous acids; partial esters of phosphorous acids; toluenesulfonic acids; and mineral acids.

8. The polymer blend of claim 1, which does not exhibit yellowing upon storage or exposure to light.

* * * * *